United States Patent [19]

Beck

[11] 4,245,724

[45] Jan. 20, 1981

[54] MANUAL RELEASE FOR A SPRING APPLIED BRAKE ASSEMBLY

[75] Inventor: Henry E. Beck, Oswego, Ill.

[73] Assignee: Caterpillar Tractor Co., Peoria, Ill.

[21] Appl. No.: 954,722

[22] Filed: Oct. 25, 1978

[51] Int. Cl.³ .............................................. F16D 65/24
[52] U.S. Cl. .................................. 188/170; 92/130 A; 188/72.1; 188/366; 192/70.27; 192/91 A
[58] Field of Search ...................... 188/170, 71.5, 72.1, 188/366; 192/70.27, 91 A, 91 R; 92/130 A

[56] References Cited

U.S. PATENT DOCUMENTS

| | | | |
|---|---|---|---|
| 3,188,922 | 6/1965 | Cruse | 188/170 |
| 3,232,175 | 2/1966 | Cox, Jr. et al. | 92/130 A X |
| 3,363,519 | 1/1968 | Clack | 92/130 A |
| 3,526,302 | 9/1970 | Grant et al. | |
| 3,712,178 | 1/1973 | Hensley | 92/130 A X |

FOREIGN PATENT DOCUMENTS 1394069  5/1975  United Kingdom ...................... 188/170

Primary Examiner—George E. A. Halvosa
Attorney, Agent, or Firm—Wegner, Stellman, McCord, Wiles & Wood

[57] ABSTRACT

Disclosed is a spring-engaged, pressure fluid-disengaged, parking brake of the disc type which includes an annular piston movable towards and away from the brake discs for engaging and disengaging the brake. The brake housing includes an aperture coaxial with the brake shaft and the piston carries a tapped bore in alignment with the aperture in the housing. A bolt may be threaded into the bore through the aperture and rotated to draw the piston towards the aperture to disengage the brake in the absence of pressure fluid.

5 Claims, 2 Drawing Figures

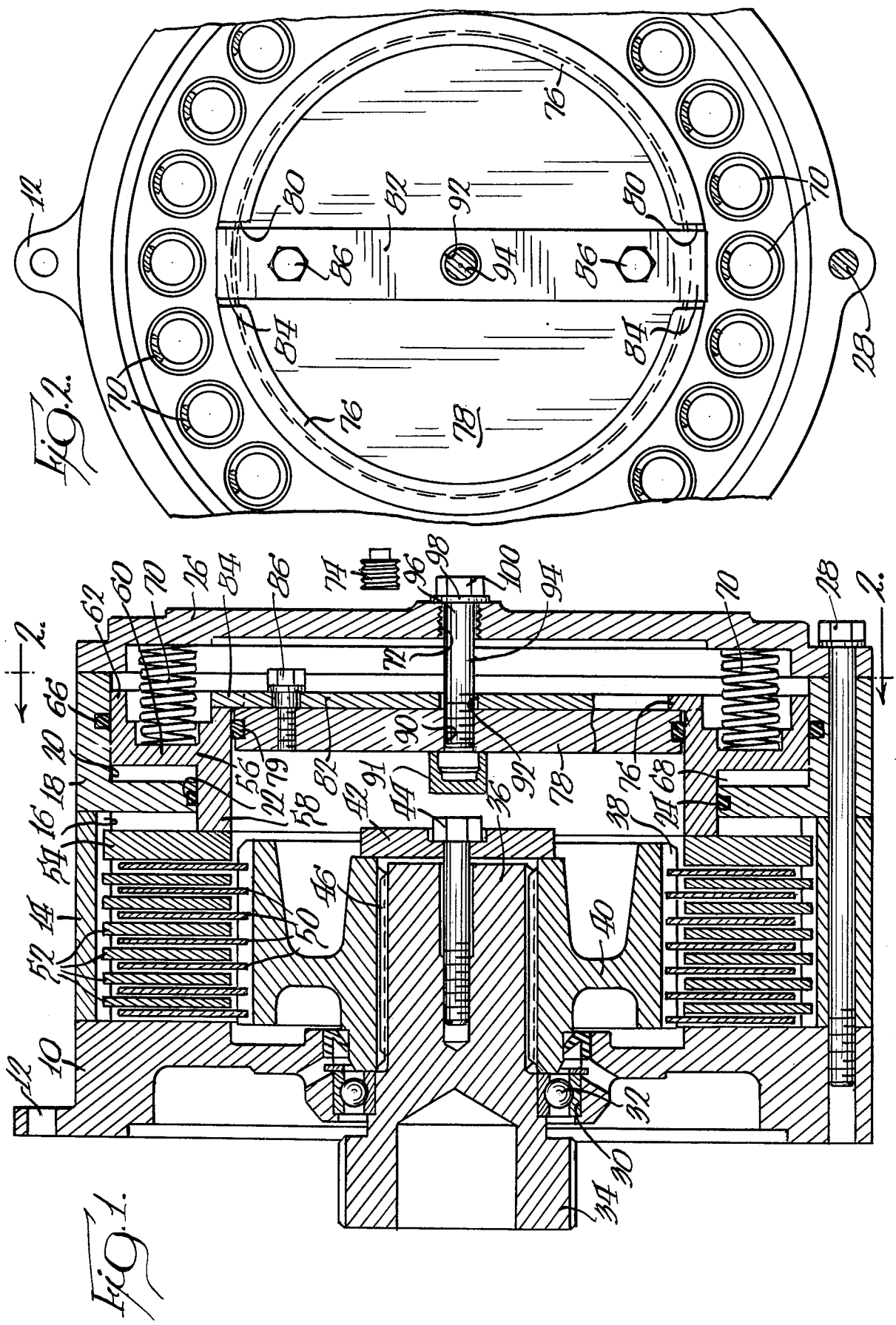

MANUAL RELEASE FOR A SPRING APPLIED BRAKE ASSEMBLY

BACKGROUND OF THE INVENTION

This invention relates to parking brakes of the type typically utilized in large vehicles such as bulldozers, etc.

Many large vehicles utilize parking brake systems distinct from the brake systems utilized in conjunction with the control of movement of ground engaging driving means, as wheels, crawler-type tracks, or the like. Because of the mass of such vehicles, the parking brake must have large capacity and, frequently, disc-type brakes of the type employing a pack of brake discs are utilized.

Such brakes may be generally categorized as pressure fluid-engaged, spring-disengaged brakes or spring-engaged, pressure fluid-disengaged brakes. In general, it is preferable to use the latter type, that is, spring-engaged, pressure fluid-disengaged brakes for the reason that when the vehicle is to be parked, in many cases, its engine will be turned off with the result that auxiliary systems such as a hydraulic pump which supplies pressure fluid to the brake will be inoperative so that no pressure fluid would be available to engage the brake for parking purposes if the brake were pressure fluid-engaged, spring-disengaged.

Another advantage of the spring-engaged, pressure fluid-disengaged type of brake is provided when there is a failure in the pressure fluid supply system, which pressure fluid frequently is utilized in performing a variety of control functions for the vehicle as well as in connection with the vehicle parking brake. In such a case, the failure will result in automatic engagement of the parking brake simultaneously with the loss of other hydraulic control functions to halt the vehicle without regard to attentiveness of the operator.

Spring-engaged, pressure fluid-disengaged parking brakes are not totally without their disadvantages, however. The principal disadvantage occurs when the vehicle is to be moved as, for example, for servicing purposes, and the pressure fluid supply system is inoperative, either due to system failure or to the inability to start the vehicle engine to drive the pressure fluid supply system. In such a case, the parking brake will be engaged, making it difficult to move the vehicle.

SUMMARY OF THE INVENTION

The present invention is directed to overcoming one or more of the above problems.

According to the present invention, there is provided a spring-engaged, pressure fluid-disengaged parking brake including a shaft adapted to be fixed to a rotating component of the drive train of a vehicle. The brake includes a housing adapted to be affixed to the frame of the vehicle and means are carried by the housing for journalling the shaft within the housing. At least two brake discs are located within the housing and about the shaft with one being slidably and nonrotatably engaged with the shaft and the other being slidably and nonrotatably engaged with the housing. The discs are slidable into engagement with each other and piston means are located within the housing to be movable therein towards and away from the discs. Springs in the housing bias the piston means towards the discs to engage the discs and fluid chamber means within the housing receive the piston means such that the application of fluid under pressure to the chamber means biases the piston means away from the discs to disengage the discs. Manually operable means are provided for interconnecting the piston and the housing and for moving the piston away from the discs to disengage the discs in the event the chamber cannot be pressurized.

Other objects and advantages will become apparent from the following specification taken in connection with the accompanying drawings.

DESCRIPTION OF THE DRAWINGS

FIG. 1 is a sectional view of a parking brake made according to the invention; and FIG. 2 is a sectional view taken approximately along the line 2—2 of FIG. 1.

DESCRIPTION OF THE PREFERRED EMBODIMENT

An exemplary embodiment of a parking brake made according to the invention is illustrated in FIGS. 1 and 2 and is seen to include a housing formed in part by an end casting 10 having a plurality of eyes 12 (only one of which is shown) whereby the housing may be attached to the frame of a vehicle with which the parking brake is to be used. The housing also includes a splined section 14 having a plurality of radially inwardly directed splines 16 on its inner surface. The splined section 14 is sandwiched between the end casting 10 and a fluid chamber section 18 having a cylindrical inner surface 20 and a radially inwardly directed flange 22 terminating in a seal and groove 24 at its inner diameter. The housing is completed by an end cap 26 and the components are coaxially secured together by a plurality of bolts 28 (only one of which is shown) extending through aligned bores in the components at desired points about the periphery of the brake.

The end casting 10 includes a central bore 30 which mounts bearings 32 which, in turn, journal a shaft 34. The shaft 34 is adapted to be connected to any desired rotating component of the vehicle drive train, preferably at some location between the transmission thereof and the tracks or wheels so that the parking brake cannot be defeated by shifting the transmission into a neutral position. An end 36 of the shaft is located within the housing and mounts radially outwardly directed splines 38 formed on a casting 40 carried by the shaft end 36 and clamped thereto by a clamping plate 42 and a bolt 44. The casting 40 is nonrotatable on the shaft 34 due to interengaging splines 46 on the shaft end 36 and the interior of the casting 40.

Within the housing, and about the end 36 of the shaft, is a brake disc pack formed of a plurality of interleaved brake discs 50 and 52. The discs 50 are slidably mounted on the splines 38 on the casting 40, while the discs 52 are slidably mounted on the splines 16 on the housing section 14. As a consequence, the shaft 34 slidably, but nonrotatably, mounts the discs 50 while the housing slidably, but nonrotatably, mounts the discs 52; and the discs 50 and 52, due to their slidable mounting, are engageable with each other in a conventional fashion.

At the right-hand end of the brake disc pack is an annular pressure plate 54 slidably mounted on the splines 16. An annular piston 56 is disposed within the fluid chamber section 18 of the housing and includes an axially directed end 58, the outer surface of which sealingly and slidably engages the seal 24 and the left-hand end of which engages the pressure plate 54.

The piston 56 further includes a radially outwardly directed web 60 terminating in an axially directed end 62 extending oppositely from the end 58 and having a cylindrical outer surface sealingly engaging a seal 66 carried on the interior of the surface 20.

As a consequence of the foregoing, an expandable, annular, fluid-receiving chamber 68 is defined by the piston 56 and the chamber section 18 of the housing and by suitable ports (not shown) fluid under pressure, typically hydraulic fluid, may be introduced into the chamber 68 to move the piston 56 to the right as viewed in FIG. 1.

A plurality of springs 70 are interposed between the end cap 26 and the web 60 of the piston 56 on the side thereof remote from the fluid chamber 68 and are openable to bias the piston 56 to the left as viewed in FIG. 1. Thus, the springs 70, when not being opposed by fluid pressure, drive the piston 56 to the left to urge the pressure plate 54 against the brake disc pack and compress the discs 50 and 52 to cause the same to frictionally interengage to prevent relative rotation between the shaft 34 and the housing. To disengage the brake, fluid under pressure is introduced into the chambers 68 to move the piston 56 to the right against the bias of the springs 70 to release axial pressure on the brake disc pack.

To effect manual release of the brake in the event of unavailability of pressure fluid, the end cap 26, on the axis of the shaft 34, is provided with a threaded bore 72 which normally may be closed by a threaded plug 74 to seal the housing. When manual disengagement of the brake is to be effected, the plug 74 is removed for purposes to be seen.

The right-hand end of the piston 56 includes a radially inwardly directed lip 76 and a plate 78 is disposed within the center of the piston 56 and in abutment with the side of the lip 76 remote from the end cap 26, as seen in FIG. 1.

As best seen in FIG. 2, plate 78 is circular in shape and as seen in FIG. 1 terminates at its outer diameter in a seal and groove 79 which seal sealingly engages the inner surface of the piston 56.

As seen in FIG. 2, the lip 76 is provided with two, diametrically opposed recesses 80 and a clamping plate 82 has its ends 84, which act as tongues, disposed in the recesses 80. Bolts 86 secure the clamping plate 82 to the plate 78 and clamp the latter against the lip 76 so that the plate 78 is affixed to the piston 56 against relative axial movement. The ends 84 of the clamping plate 82 serve to prevent relative rotation between the plate 78 and the piston 56 by reason of their disposition in the recesses 80.

Coaxially with the shaft 34, the plate 78 is provided with a threaded bore 90 of lesser diameter than the bore 72. The bore 90 opens toward the bore 72 and since it likewise is located in the axis of the shaft 34, the two bores 72 and 90 are in alignment. The bore 90 is closed on the side remote from bore 72 by a cap 91 suitably secured in place. The cap 91 and the seal 79 prevent entry of foreign material into the vicinity of brake discs 50 and 52.

The plate 82 is provided with a bore 92 in alignment with the bore 90 and of greater diameter than the latter.

To manually disengage the brake, the shank 94 of a bolt 96 sized to be threadably received into the bore 90, as illustrated in FIG. 1. If desired, a washer 98 may be interposed between the head 100 of the bolt 96 and the end cap 20.

As the bolt 96 is rotated once its shank 94 is threadably engaged in the bore 90, at some point in time, the head 100 will bottom out against the end cap 26 with the result that further rotation will advance the shank 94 further into the bore 90 but since leftward movement of the bolt 96 is restrained by the end cap 26, such continued rotation will draw the piston 56 to the right against the bias of the spring 70 to release the engaging pressure on the brake disc pack to disengage the brake. It if is desired to re-engage the brake, it is only necessary to remove the bolt 96 at which time the bias of the spring 70 will cause the brake to re-engage.

From the foregoing, it will be appreciated that a parking brake made according to the invention provides all of the advantages of spring-engaged, pressure fluid-disengaged brakes and overcomes the disadvantages thereof by providing a means whereby the brake may be disengaged in the absence of a supply of fluid under pressure. At the same time, those skilled in the art will appreciate the simplicity of the structure utilized to cause manual disengagement of the brake in that only a single instrument, one bolt 96, need be utilized.

It will also be recognized that the invention is not restricted to parking brakes for vehicles, but can also be employed with efficacy in other uses where brakes are required.

The embodiments of the invention in which an exclusive property or privilege is claimed are defined as follows:

1. A spring engaged, pressure fluid-disengaged, brake assembly comprising: a shaft adapted to be affixed to a rotating component of a mechanism and having splines on an end thereof; a housing adapted to be affixed to the frame of a mechanism; means carried by said housing journalling said shaft such that said splines are within said housing; additional splines within said housing; at least two brake discs within said housing and about said shaft, one slidably engaged with said shaft splines and the other slidably engaging said additional splines, said discs being engageable with each other; an annular piston within said housing and movable therein toward and away from said discs; springs in said housing biasing said piston toward said discs to engage said discs; a fluid chamber within said housing and receiving said piston, the application of fluid under pressure to said chamber biasing said piston away from said discs to disengage said discs; an aperture in said housing extending axially of said shaft; a threaded bore carried by said piston and opening toward said aperture and axially aligned therewith; whereby a bolt may be introduced into said aperture to be threaded in said bore to draw said piston towards said aperture and against the bias of said springs to disengage said discs; said piston, on its radially inner surface, carrying a radially inwardly directed lip, said bore being located in a lip engaging plate engaging said lip on the side thereof remote from said aperture, and means preventing relative rotation between said piston and said lip engaging plate, said preventing means comprising recesses in said lip and tongues carried by said plate and disposed in said recesses, said tongues being defined by the opposite ends of a clamping plate secured to said lip engaging plate so that said lip engaging plate is clamped to said piston to move substantially therewith.

2. The spring-engaged, pressure fluid-disengaged brake assembly of claim 1 wherein there is a single threaded bore and a single aperture, both located on the axis of said shaft.

3. The spring-engaged, pressure fluid-disengaged brake assembly of claim 2 wherein said bore extends through said lip engaging plate, and further including a hollow cap closing said bore on the side thereof opposite said aperture.

4. The spring-engaged, pressure fluid-disengaged brake assembly of claim 3 further including a seal disposed about the periphery of said lip engaging plate and sealingly engaging said radially inner surface of said piston.

5. The spring-engaged, pressure fluid-disengaged brake assembly of claim 4 wherein said aperture comprises an additional threaded bore of larger diameter than said first-named threaded bore and adapted to be normally closed by a threaded plug.

* * * * *